United States Patent [19]
Bartlett et al.

[11] Patent Number: 5,444,390
[45] Date of Patent: Aug. 22, 1995

[54] MEANS AND METHOD FOR SEQUENTIALLY TESTING ELECTRICAL COMPONENTS

[75] Inventors: Charles E. Bartlett, Buffalo Grove, Ill.; Robert Bower, Jr., Bryan, Tex.; Brady L. Cleaver, Bryan, Tex.; George C. Smith, Bryan, Tex.

[73] Assignee: Texas Digital Systems, Inc., College Station, Tex.

[21] Appl. No.: 190,312

[22] Filed: Feb. 2, 1994

[51] Int. Cl.⁶ .................................. G01R 31/00
[52] U.S. Cl. ............................. 324/770; 324/767; 324/537; 324/73.1; 371/21.1; 371/21.3
[58] Field of Search .................. 324/767, 537, 73.1, 324/770; 371/21.1-21.6

[56] References Cited

U.S. PATENT DOCUMENTS

| | | | |
|---|---|---|---|
| 3,686,661 | 8/1972 | Sharpless | 340/762 X |
| 4,728,188 | 3/1988 | Kitagawa et al. | 324/767 |
| 4,764,728 | 8/1988 | Sato et al. | 324/767 |
| 5,235,272 | 8/1993 | Henley | 324/770 |
| 5,276,400 | 1/1994 | Denyer et al. | 324/537 |

*Primary Examiner*—Kenneth A. Wieder
*Assistant Examiner*—Kourosh Cyrus Khosravi
*Attorney, Agent, or Firm*—Akin, Gump, Strauss, Hauer & Feld

[57] ABSTRACT

An apparatus for testing respective electrical components in situ within a circuit having a plurality of the electrical components. A power bus is connected between a power source and switching devices operable for conducting test current to respective ones of the electrical components. A comparator circuit includes inputs connected to the power bus and to a reference potential. A processor is programmed to actuate respective switching devices for causing a test current to be conducted from the power bus through a respective component, while sensing any output signal from the comparator circuit corresponding to an increased potential on the power bus indicative of a reduced current flow caused by an open or failed component. An isolating resistor is connected between the power bus and the power supply, and a bypass switch is connected in parallel with the isolating resistor for bypassing the isolating resistor and conducting operating power directly to the power bus, for operating the circuit when testing is not in progress.

22 Claims, 2 Drawing Sheets

MEANS AND METHOD FOR SEQUENTIALLY TESTING ELECTRICAL COMPONENTS

FIELD OF THE INVENTION

This invention relates in general to testing circuits and, more particularly, to a system and method for sequentially testing individual electrical components in an array of said components.

BACKGROUND OF THE INVENTION

In the testing of electrical components, wherein a plurality of components in an electrical circuit are to be tested, it has been difficult to identify failed components in situ, while the components remain in the circuit, because of the difficulty of distinguishing electrical characteristics of a respective component from those of associated components or groups of components within the circuit. Additionally, it has been difficult to test individual components sequentially in circuits having large numbers of such components. This invention is particularly applicable for testing components in situ, particularly those which fail in an open or nonconductive condition, wherein current is not permitted to pass readily through the components. For example, in illuminated display systems, such as displays incorporating arrays of incandescent lamps, LEDs, or the like, a large number of individually illuminated devices must be maintained and serviced. Thus, in an LED array utilized in a commercial display sign, there may be as many as 10,000 or more light emitting diodes, each of which is subject to fail in an open condition. As will be apparent to those in the art, sequential testing of the resistance of each device(s) in such an array by means of individual testing procedures may be difficult and time consuming.

Accordingly, certain prior-art systems have utilized various complex testing circuits capable of evaluating the response of a plurality of such components. The testing of such arrays of electrical devices is of particular commercial interest with respect to the testing of commercial displays, which are commonly used as illuminated signs in small businesses and the like. Typically, individual LEDs in such arrays tend to fail during extended use. Whereas one or two failures will not significantly affect the appearance of the display, the appearance and legibility of the sign deteriorates as additional LEDs are burned out over time. Whereas such displays may be visually inspected for such failed devices, it is advantageous that an automated, electrical testing circuit be provided to provide timely notification to an operator that one or more LEDs have failed and for identifying the row and column of the failed device.

SCOPE OF THE PRIOR ART

In the past, because of the difficulty of testing individual components in such arrays of components, as discussed above, it has been sought to expedite the testing procedure by testing groups of components simultaneously, rather than performing tests on respective individual components. In certain prior-art testing procedures, the response curves of entire rows or columns of LED devices or the like are evaluated. However, whereas such testing apparatus are advantageous for expediting the testing procedures in some applications, they do not identify the particular components which have failed. Additionally, such prior-art testing systems are expensive and complex, in that they must incorporate systems for identifying and evaluating minor changes in the response curve of a plurality of components, e.g., changes caused by a failure of only one of a plurality of components in a row or column of light emitting devices, by comparing the electrical characteristics of the plurality of components with a predetermined reference response curve corresponding to a nominal, characteristic response curve for the respective row or column. In some cases, such testing circuitry may entail multiple AC power sources, multiple transformers, and the like. Typically, a varying voltage is applied to the tested components during a testing sequence for generating a response curve, wherein the current through the circuit section being tested is compared with the applied voltage. The results are then compared with a nominal response curve stored in a ROM memory device or the like in the testing system. Such circuitry, as has been suggested above, is complex, undesirably expensive, and, unless precisely calibrated, may fail to identify defective components. Further, such techniques do not readily lend themselves to in situ testing, wherein the tested components remain interconnected with a number of other components which entail resistances of their own, which would have to be distinguished from those of the tested components.

It is, therefore, more determinative if each component is individually tested. However, in prior testing systems, such selective testing procedures have been difficult and expensive because it has been necessary to apply a test current through a multiplicity of test points within the circuit. That is, it has been necessary to apply test currents to test points communicating respectively with individual components to be tested. As will be apparent, if testing probes must be connected to test points for each of some 20,000 LEDs within an array, the testing procedure would be exceedingly time consuming, tedious, expensive and thus, impractical for many commercial applications.

In some prior-art testing systems, it is required that components in an array of diodes or other components be disconnected from the circuit to permit testing of the components discretely, without interaction with or interference from associated elements of the circuit. In commercial applications, however, it may be difficult to disconnect diodes, or other components, from the other circuit components each time the system is to be tested. Additionally, such procedures typically would require the services of a skilled technician at the commercial site in which a display is in use, or the removal of the entire display unit, either of which would tend to be inconvenient and expensive.

OBJECT OF THE INVENTION

It is, therefore, a major object of the invention to provide a new and improved testing circuit and method in which discrete components within an array of such components may be individually tested.

It is a further object of the invention to provide such a testing circuit in which testing is accomplished by sensing variances in potential at a single test point rather than at a plurality of test points connected to respective electrical devices.

A further object of the invention is to provide such a circuit which is operable sequentially to test individual components of an array or group of components by applying a test current through the device, and which includes means for isolating the respective electrical device to be tested from other loads within the circuit without disconnecting components of the circuit.

A still further object is to provide such a testing circuit which is of practicable, inexpensive design and construction, capable of being utilized conveniently as a part of a commercial LED display or the like, and which, in operation, does not require disconnecting the respective components of the display system.

Other objects and advantages of the invention will become apparent from the specification and appended claims and from the accompanying drawings illustrative of the invention.

SUMMARY OF THE INVENTION

The foregoing objects are realized by a testing system in which a common power bus is connected to each of the LED drivers of an LED display system and is selectively connected to a testing current, and whereby a predetermined test current is sequentially applied to each respective LED in the array. A single testing point or terminal associated with the common power bus is connected to one input of a comparator circuit, the other input being connected to a reference voltage, for comparing the response of the individual components as test current is applied to the respective components. The testing procedure is under the control of a microcontroller which has been programmed to control the sequential application of test currents applied to the respective devices. The microcontroller is also operable to actuate an isolating or bypass relay connected in series between the power supply for the circuit and the common power bus for the LEDs, the relay being normally closed for conducting power from the power source to the common power bus and, upon being activated by the microcontroller, being opened to connect the power source in series with an isolating resistor connected between the power source and the test terminal of the comparator circuit, isolating the respective individual components from other loads within the circuit. The isolating resistor is thus bypassed during normal operation of the display system, wherein an operating current may be passed through the bus for driving one or more LEDs. In accordance with the invention, the bypass relay, isolating resistor, and comparator circuit permit testing of individual components without disassembling or disconnecting individual components from the circuit, thereby providing sequential incircuit testing of the components.

DETAILED DESCRIPTION OF THE PREFERRED EMBODIMENTS

In the description which follows, an embodiment of the circuit assembly of the present invention is described as implemented in an LED array drive circuit, for the testing of an LED array such as those utilized in commercial LED display signs. It will be appreciated, however, that the circuit assembly may be used for the testing of other types of resistive electrical components, such as diodes, transistors, resistors or the like, which are subject to fail in an open condition. Whereas particular controllers and driver circuits have been described herein, it will be apparent to those in the art that the invention is not limited in its application to these particular components.

Figure 1:
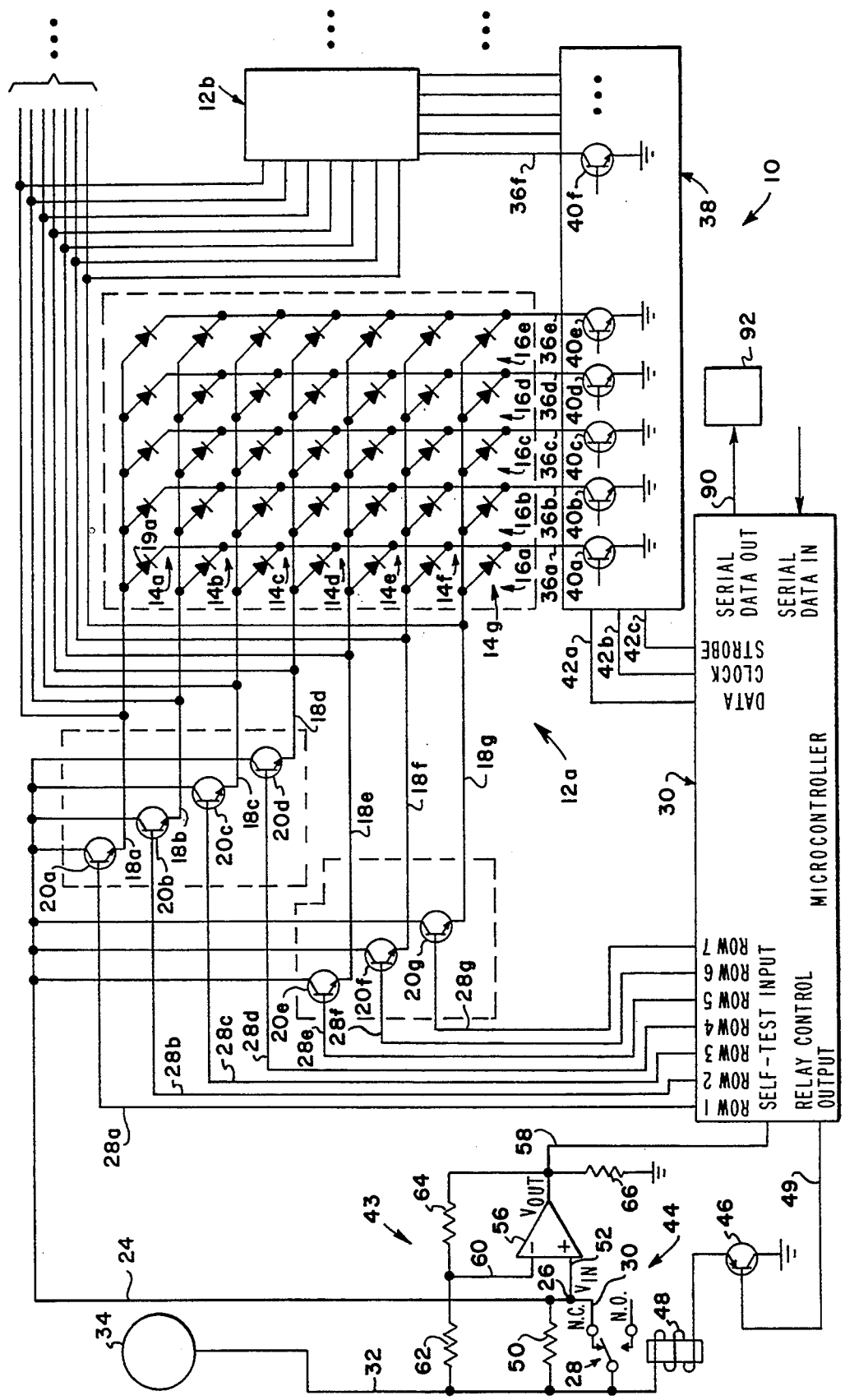
FIG. 1 is a schematic, and partially block diagram of one embodiment of the testing circuit.

Referring now to the drawings, and initially to FIG. 1, the illustrative embodiment of the testing circuit 10 is utilized for the testing of an LED module 12a, such as a Hewlett-Packard HDSP-L101 LED module. Such modules include a total of 35 LEDs arranged in a 5×7 configuration. The LEDs are arranged in rows, such as rows 14a–14g as shown in the drawing, and columns, such as columns 16a–16e. As also seen in the drawing, a plurality of such modules, such as modules 12a, 12b are typically employed, connected in series. In such modules, the LEDs within a given row of LEDs have their anodes connected together, and each column of LEDs has its cathodes interconnected. This matrixed configuration requires that the LEDs be sequentially activated (refreshed) at a repetition rate fast enough to provide a continuous visual image to the eye. Typically, all of the rows of one module must be refreshed about 65 times per second to display a continuous image, which means that the refresh rate for each LED is 455 times per second. Referring to the drawing, a plurality of leads 18a–18d and 18e–18g are connected to drive the respective rows 14a–14g, each being connected to the emitter terminal of a respective driver transistor, 20a–20g, incorporated in the respective LED driver modules, which are suitably ULN2074 driver modules such as those available from the Allegro Semiconductor Company. Such driver chips include four driver transistors. The collectors of each of the driver transistors 20a–20g are connected to a common LED power bus 24 which is connected through test point 26, and a normally closed relay 28, via lead 30 and lead 32 to the common system power source 34, which is suitably a +5 volts DC supply. The base terminals of transistors 20a–20g, which are NPN devices in the present embodiment, are connected by lines 28a–28g to respective output ports of a microcontroller 30, which is suitably a Motorola 68HC05C3 microcontroller which includes a microprocessor, RAM, ROM, and EEPROM. In operation, as is known in the art, such microcontrollers are programmed in accordance with the particular desired display to supply an activating voltage to the base of respective ones of the switching transistors 20a–20g, for switching the transistors to conductive states whereby 5-volt DC power from power supply 34 may be conducted through power bus 24, through a respective, activated or conductive transistor 20, to the particular row of devices to be illuminated.

The construction and operation of such LED arrays, and of their respective drivers, is well known to those skilled in the art and, therefore, will not be described in detail herein. One example is shown in U.S. Pat. No. 5,134,387 and U.S. Pat. No. 5,278,542 which are hereby incorporated by reference. In summary, however, power is applied to a given row, such as to one of rows 14a–14g of LEDs, each lead 18a–18g being connected to the anodes of the respective LEDs in a particular row. It is then necessary to provide a connection to ground from the cathode of a respective device to be illuminated. This is accomplished by the use of a column driver circuit 38, such as a UCN5832 driver circuit, commonly known as a "smart driver" and also available from the Allegro Semiconductor Company. Such a "smart driver" includes a plurality of driving or switching transistors, some of which are illustrated at 40a–40e, having their collector terminals connected, respectively, to lines 36a–36e and having their emitters connected to ground. When they are switched on, they complete the circuit through the respective LED to be illuminated. Additionally, as illustrated at 40f, a plurality of other switching transistors are suitably employed which are respectively connected to columns of LEDs in additional LED arrays. As known in the art, such smart driver circuits include internal latching shift registers connected to the base terminals of the respective driver transistors 40a–40f and which are switched to a conductive state by the selective application of signals from ports from the shift registers, connected to receive output control signals via the data, clock and strobe inputs, as indicated at 42a, 42b, 42c, which are respectively connected to data, clock, and strobe output ports of the microcontroller 30. In operation, the smart driver 38 is under the control of microcontroller 30. When it is appropriate for a particular LED to be illuminated, power is thus applied through the appropriate one of the driver transistors 20a–20g to the particular row of LEDs in which the selected LED is present. Power is also applied through an appropriate one of column transistors 40a–40e to the particular column, whereby power is conducted through one of the transistors 20a–20g to the LED and returned to ground through the appropriate switching transistor (40a–40e) within the column driver 38.

In accordance with the present invention, the power bus 24 through which current is applied to the respective LED is isolated from other loads within the circuit. Thus, power bus 24 is connected only to the row driver modules containing transistors 20a–20g and conducts power to the respective transistor from a unique isolating test section 43, including switching circuit 44. Switching section 44 is connected via lines 30–32 to the 5-volt power source 34 and, through the normally closed relay 28, to the common power bus 24, during normal operation of the circuit. During testing, however, relay 28 is activated by means of a switching transistor 46, which is connected between relay coil 48 and ground for applying current to activate the relay 28. Switching transistor 46 is suitably a 2097 transistor having its collector connected to ground and having its base connected via line 49 to a relay output port of the microcontroller 30. In operation, as will be more fully described hereinbelow, activating potential is applied to the base of transistor 46, switching the transistor to a conductive state for completing the circuit between 5-volt power supply 34 and ground through relay coil 48, thereby activating the relay 28, and opening its switch, forcing current from power supply 34 to flow through an isolating resistor 50, suitably of 10 ohms, connected between bus 24 and line 32. Accordingly, there is a drop in potential on line 30 and the test point 26 because of the resistance of isolating resistor 50. Line 52 connects the isolating resistor 50 to the noninverting input of an LM358N operational amplifier used as a comparator 56, the output of which is connected via line 58 to a test input port of the microcontroller 30. The inverting input of comparator 56 is connected via line 60 to a voltage divider including resistor 62, which is suitably a 10K ohm resistor, acting in conjunction with a 100K ohm resistor 64 connected in series between the inverting input of the comparator 56 and its output, forming a voltage divider for providing an appropriate bias across the comparator 56. Power from power supply 34 is thus conducted through lead 32 and resistor 62 to the inverting input of comparator 56. Additionally, a 6.8 Kohm load resistor 66 is connected between the output of comparator 56 and ground for isolating the test circuit 43 and minimizing any potential isolation at the output of comparator operational amplifier 56 which could be caused if the amplifier did not have an appropriate load, because of the high impedance of the digital input ports of microcontroller 30.

The UCN5832 column driver 38 is suitably a chip which contains 32 drive transistors. Each transistor has its emitter connected to ground and its collector connected to the cathodes of a column of LEDs. Also, a series of 32-shift registers (not shown) and 32 latches (not shown) are incorporated within the smart driver 38, the outputs of which are connected to the base of the corresponding transistor. The data in clock control line 42b is used to shift data into the shift registers. The strobe control line 42c is used to transfer the data from the shift registers into the latches. This arrangement allows the circuit to serially load the column data by multiplexing techniques, utilizing only the three lines 42a, 42b, and 42c. The smart driver 38 is thus used for convenience in driving a multiplicity of LED arrays e.g., arrays 12a, 12b, simplifying the circuit.

The operation of the circuit will now be described in greater detail. In normal operation, i.e., when the LEDs are being used to display information, the relay output control port 49 is high, or about +5 volts. This keeps the switching transistor 46 turned off, since it is a PNP transistor, and thus, no current flows through the relay coil 48. The relay 28, being in its normally closed position as seen in the drawing, thus bypasses the 10-ohm isolating resistor 50 and conducts 5-volt power from power supply 34 directly to the LED power bus 24. As will be apparent, in its normally closed position, the relay 28 bypasses the 10-ohm resistor 50 with a very low resistance path. A relay is advantageously used in the present circuit because of the relatively substantial power levels required for driving large numbers of LEDs when a multiplicity of LEDs is illuminated in the display. In other applications, however, other forms of switching devices, such as solid-state relays, MOSFET transistors, and the like, could be utilized instead.

Figure 2:
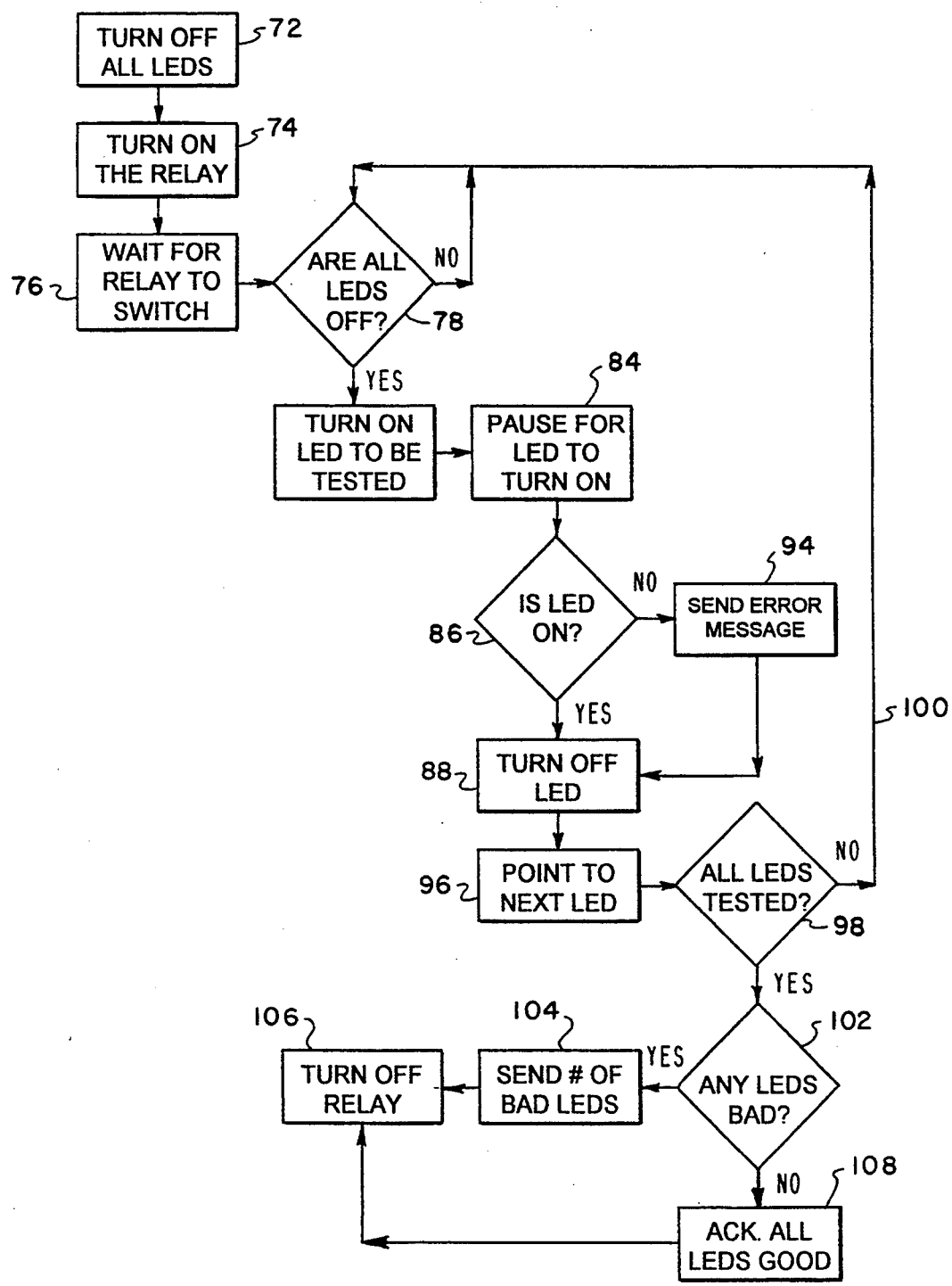
FIG. 2 is a flow chart illustrating the testing procedure.

The self-test procedure is initiated by any suitable means, suitably by the closing of a switch input, not shown, to the microcontroller 30, initiating the series of steps illustrated in FIG. 2. The procedure illustrated in FIG. 2 is suitably programmed in the ROM memory of the microcontroller 30. With additional reference now to the flow chart illustrated in FIG. 2, the steps are as follows. As shown in action block 72, each of the LEDs of the display are turned off initially to prevent overloading of the test circuit, particularly the isolating resistor 50, when testing current is applied. Otherwise, the 10-ohm isolating resistor 50 could be overloaded. At action block 74, switching transistor 46 is then switched to a conductive state by a potential applied from microcontroller 30 along line 49, thereby closing the circuit from power supply 34, via line 32, through coil 48, to ground, thereby opening relay 28 and removing the bypass between power supply 34 and the common bus 24, forcing the current to pass through isolating resistor 50. The potential at relay control output port along line 49 is normally 5 volts, and the potential drops to 0 volts during the test procedure, which turns on the transistor 46. Thus, the 10-ohm resistor 50 is no longer bypassed, and any current applied to drive an LED is forced to flow through the 10-ohm resistor. At action block 76, a delay in the testing procedure is entailed to permit the relay 28 to switch to its open position. A high current capacity relay, such as a Potter and Brumfield T90S5D12-5 model relay, is suitably employed, although any high power, fast acting relay requiring only a low energizing voltage may be employed. The relay, in practice, requires a pause time of about 4.3 microseconds. After the 4.3 microsecond pause, at decision block 78, the system checks to see that all of the LEDs are turned off by sensing that no current is flowing along common power bus 24. This is accomplished by checking the self-test input 58 for a high voltage condition. Utilizing the particular microcontroller 30, any voltage above about 2.5 volts is interpreted as a "high" condition, and any voltage below about 1.5 volts is considered a "low" voltage condition. Assuming that all LEDs are turned off, no current flows through the 10-ohm isolating resistor 50. Accordingly, both inputs of the operational amplifier 56 are at the same voltage potential, i.e., at about +5 volts.

Regarding the circuit divider provided by resistors 62 and 64, and referring to the equations Vout=Vin+(-Vin-Vcc)R2/R1, R1 is the resistance of resistor 62, e.g., 10K ohms; R2 is the resistance of resistor 64, e.g. 100K ohms; Vout is the output voltage, i.e., the self-test voltage conducted through comparator 56 along output line 58; Vin is the input voltage applied on the noninverting input of comparator 56 via line 52; and Vcc is the voltage applied to the inverting input of comparator 56 through resistor 62 on line 60. Assuming a potential of +5 volts for Vin and Vcc, Vout is also about +5 volts. Since the operational amplifier 56 will saturate at approximately +9 volts, the selftest output is about. +5 volts. This is above the threshold voltage for the test input of the microcontroller 30, and it is therefore interpreted by the microcontroller as a "high" condition. Alternatively, if a voltage is not high, i.e., a negative condition, the test at action block 78 is repeated until a true result is obtained. Optionally, a negative condition could be interpreted to indicate a short somewhere in the circuit under test.

Assuming that the LEDs are turned off and that a high condition exists at test input lead 58 and at the test input port, the LED to be tested is then turned on. Starting at one LED position, i.e., at the upper left LED 19a, the appropriate row and column transistors 20a and 40a are then turned on to test the first LED. As indicated at action block 84, the test voltage remains on for a period of time to permit the LED to be illuminated, assuming that the LED has not failed (i.e., that the LED is conductive rather than open) and for the self-test circuit to respond. For example, a pause time of about 0.17 microseconds has been found to give satisfactory results. This pause (i.e., 0.17 microseconds plus the time entailed for the LED to turn off prior to testing of the next successive LED) gives a total test cycle time of approximately 0.30 microseconds, permitting the testing of about 3,000 LEDs per second. At decision block 86, the system then determines whether the respective LED is turned on, i.e., whether the LEE) is conductive, indicating that the LED is good. This is accomplished by sensing that there has been a drop in potential, of about 0.4 volts, at the test point 26, causing the voltage Vin applied to the noninverting input terminal of operational amplifier 56 to be lower than that applied to the inverting terminal, therefore causing the amplifier to be nonconductive and causing the output voltage on line 58 to drop, whereby the microcontroller test input voltage drops, indicating a completed circuit through the LED (19a) being tested. That is, if the tested LED is good, current will flow through the drive transistors 20a, 40a and the LED lighting the LED. The LEDs used in the present example, for example, draw about 40.0 mA. This current also flowing through the 10-ohm resistor 50 results in a 0.4 volt drop across that resistor. At this point, the noninverting input of the operational amplifier 56 is 4.6 volts, while the inverting input is still at +5 volts. Referring now to the equation, $$Vout = 4.6 + (4.6 - 5)\frac{100K}{10K} = 4.6 - (0.4)\frac{100}{10} = 0.6,$$

and the output voltage transmitted along line 58 is therefore equal to 0.6 volts, indicating that the LED is good. Since 0.6 volts is below the lower threshold of the microcontroller 30, the microcontroller will interpret this as a low condition, meaning that the LED being tested is good. Subsequently, the tested LED is turned off, as indicated at action block 88. It will be noted that, during testing, the 6.8 Kohm resistor 66 serves to bleed a portion of the potential to ground, acting as a load resistor to prevent oscillation of the operational amplifier 56.

Alternatively, if the tested LED is nonconductive, i.e., is open or burned out, the self-test input to the control circuit would be +5 volts, i.e., the same as an "LED off" condition, and the control circuit would indicate an appropriate error message via the serial communications output port, as indicated at 90 (FIG. 1) to any suitable alarm 92, or, alternatively, to a control computer or other circuitry, not shown, for alerting an operator to a failed LED, as shown at action block 94 (FIG. 2).

Assuming, however, that the initially tested LED is good, current is turned off, as indicated at action block 88, and the microcontroller 30 initiates testing of the next LED, as indicated at action block 96. Subsequently, at decision block 98, the microprocessor determines whether all LEDs in the LED arrays to be tested have in fact been tested. If not, a message is sent, shown by path 100, to decision block 78 to repeat the above described test procedure. Alternatively, assuming that all the LEDs have been tested, and as indicated at decision block 102, the microprocessor determines whether any LEDs are bad. If so, and as indicated at action block 104, the respective identification number e.g., the column and row number of the bad LEDs, are identified and sent to a control computer or the like for reference by a repair technician. Subsequently, the relay 28 is deactivated or turned off, as indicated at action block 106. At action block 108, in the alternative event that no LEDs are bad, the circuit does not emit any error output signal and the relay is also turned off, at action block 106. The relay is then deactivated and the microprocessor 30 is capable of normal operation, for activating selected LEDs during normal display operation of the LED display.

As an alternative, since some LED arrays are packaged as modules, which are often mounted on circuit boards meant to be replaced as a unit, the microprocessor 30 may be programmed such that, when the self-test circuit detects a bad LED in one module, it can skip the remaining LEDs in that module or board and go on to the next module.

It will now be seen that the present system provides both an operative LED array display system, operated by controller 30, as well as a test system, either of which may be operated without interference with each other, and wherein a single, isolated driver control power bus 24 is utilized during both the operation and testing procedures. Because of the use of the comparator circuit 56 and relay 28, activated by relay actuating transistor 46, each individual LED is sequentially tested, and faulty or open LEDs are definitively identified by column and row number, or other identifying number. Further, the circuit does not require the use of complex testing circuitry for evaluating the response curves of individual LEDs or sections of LEDs, and for comparing such response curves with reference curves, as has been attempted in the past. In fact, the components of the testing section 43, including the comparator 56, relay 28, switching transistor 46, and resistors 50, 62, 64, are commonly available as relatively inexpensive components. Moreover, the system 10 does not require multiple AC power supplies, transformers, logic circuits, or the like. The operation of the system is conveniently accomplished by simple programming routines incorporated into the microcontroller 30. Accordingly, the system permits precise, yet convenient testing of a plurality of LEDs or other electrical components.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. Apparatus for testing respective electrical components in a circuit comprising a plurality of the electrical components, a power bus being provided for conducting power to operate the electrical components, the apparatus comprising:

means for applying a test current through the power bus to a respective electrical component within the circuit;

comparator means having a first input terminal connected to the power bus, and a second input terminal connected to a source of a reference voltage, the comparator means comprising means for comparing the potential on the power bus during application of a test current to an electrical component with the reference voltage and producing an output signal, in response to a predetermined level of potential on the power bus relative to the reference voltage; and processor means, connected to the comparator means and the means for applying a test current and operable to actuate the means for applying a test current to apply test current to selected ones of said electrical components sequentially, the processor means further being operable for detecting the occurrence of an output signal from the comparator means during the application of a test current to a selected electrical component to determine if the selected electrical component is electrically conductive.

2. The apparatus of claim 1, wherein the means for applying a test current comprises an input switching means connected to the power bus and the selected electrical component.

3. The apparatus of claim 2, wherein the input switching means comprises a switching transistor having its base connected to the processor means, and wherein the processor means comprises means for initiating a test of the selected electrical component by biasing the switching transistor to a conductive state.

4. The apparatus of claim 3, further comprising a return switching means connected between the selected electrical component and ground, the processor means comprising means, connected to the return switching means, for maintaining the return switching means in a conductive state while maintaining the input switching means in a conductive state, for completing a circuit between the power bus, through the respective input switching means, electrical component, return switching means, and ground during testing of the selected electrical component.

5. The apparatus of claim 1, further comprising a power supply and an isolating resistor connected between the power supply and the means for applying a test current.

6. The apparatus of claim 5, further comprising bypass switching means providing a switchable bypass circuit connected in parallel with the isolating resistor, and means for actuating the bypass switching means to interrupt the bypass circuit during testing of an electrical component.

7. The apparatus of claim 6, wherein the bypass switching means comprises a remotely actuable power relay, the apparatus further comprising a switching means for applying current to the power relay for actuating the power relay, the processor means comprising means operatively connected to the switching means.

8. Apparatus for sequentially testing LEDs within a circuit having a plurality of LEDs in an array, and an LED driver circuit connected in series with a power bus and the LEDs for conducting current to selected LEDs in the array, during an operative mode, for illuminating the selected LEDs to form a pattern of illuminated LEDs, the apparatus comprising:

a power supply, and switching means for connecting the power supply to the power bus during the operative mode for supplying operating power through the driver circuit to the selected LEDs, an isolating resistor interconnecting the power bus and the power supply, the switching means further comprising means for bypassing the isolating resistor during the operative mode and for causing the power bus to receive power from the power supply through the isolating resistor during a testing mode;

control means operably connected to the switching means and the driver circuit for actuating the driver circuit, during the testing mode, for conducting test current through selected ones of the LEDs while the power bus is connected through the isolating resistor to the power supply; and voltage responsive testing means operably connected to the power bus and the control means for providing an error signal to the control means indicative of a failed LED, the control means further comprising means for identifying a failed LED by correlating the error signal to the selected LED through which a testing current is being conducted, and for providing an output signal identifying the failed LED.

9. The apparatus of claim 8, wherein the voltage responsive testing means comprises a comparator means for comparing the potential on the power bus during a testing mode with a reference potential, the comparator means having an output terminal connected to the control means, a first input terminal connected to the power bus, and a second input connected to the reference potential.

10. The apparatus of claim 9, wherein the second input terminal of the comparator means is an inverting input terminal.

11. The apparatus of claim 9, further comprising a voltage dividing network connected to the power supply, the second input terminal of the comparator means, and the output terminal of the comparator means, the voltage dividing network comprising means for providing the reference potential to the second input terminal of the comparator means.

12. The apparatus of claim 9, the switching means comprising normally closed relay means, connected in parallel with the isolating resistor, for bypassing the isolating resistor during the operative mode.

13. The apparatus of claim 12, further comprising actuating circuit means connected to the normally closed relay means, the control means being connected to the actuating circuit means and comprising means for biasing the actuating circuit means in a closed condition for conducting an operating potential to the normally closed relay means for opening the relay means and disconnecting a bypass circuit in parallel with the isolating resistor when testing of the LEDs is desired.

14. The apparatus of claim 8, wherein LED devices are arranged in an array comprising a plurality of rows and columns of LEDs, wherein the LED driver circuit includes a first series of switching devices connected to respective rows of LED devices and a second series of switching devices connected to respective columns of LED devices.

15. The apparatus of claim 14, wherein one of the series of switching devices is connected between the power bus and the LED devices, and wherein the other series of switching devices is connected between the LED devices and ground.

16. A method for sequentially testing light emitting devices in a display circuit including an array of light emitting devices and having a power supply connectable via a power bus and through controllably switchable device driver devices connected in series with the power bus and respective light emitting devices, for conducting operating power to selected light emitting devices for illuminating the selected light emitting devices in a desired pattern during operation of the display circuit, the testing method comprising:

connecting an isolating resistor in series between the power supply and the power bus;

sequentially actuating respective device driver devices to place them in a conductive state for connecting the power bus with respective light emitting devices in a predetermined sequence for permitting test current to flow through the isolating resistor and the power bus and through the device driver devices and the associated light emitting devices;

determining whether a respective one of the light emitting devices has failed in an open, non-conductive condition by evaluating the potential on the power bus when at least one device driver device has been actuated to connect an associated light emitting device with the power bus.

17. The sequential testing method of claim 16, wherein the step of determining whether respective ones of the light emitting devices have failed comprises determining whether the potential on the power bus during the-testing of a respective one of the light emitting devices is greater than a predetermined level.

18. The sequential testing method of claim 17, wherein the predetermined level of potential corresponds with a reduced potential on the power bus occurring when test current is permitted to flow from the power supply and, successively, through the isolating resistor, the power bus, a respective device driver device, an associated light emitting device which is in a conductive condition, and ground.

19. The method of claim 17, wherein the potential on the power bus is evaluated by comparing it with a predetermined reference voltage corresponding with the predetermined level.

20. The sequential testing method of claim 18, comprising providing a control means and programming the control means to actuate selected ones of the device driver devices sequentially for predetermined intervals of time to permit illumination of a respective associated light emitting device.

21. The method of claim 20, further comprising programming the control means to respond to the occurrence of an inappropriately high potential on the power bus resulting from an interruption of test current caused by an open light emitting device and for providing an output signal identifying the open light emitting device.

22. The method of claim 21, further comprising the step of identifying the open light emitting device by correlating the time of the occurrence of inappropriately high potential on the power bus with the status of a sequential testing procedure directed by the control means.

* * * * *